United States Patent [19]

Baumann et al.

[11] Patent Number: 4,847,347
[45] Date of Patent: * Jul. 11, 1989

[54] ALKYLATED TRIAMINES AND HIGHER POLYAMINES AS CURING AGENTS IN POLYURETHANE MANUFACTURE BY REACTION INJECTION MOLDING

[75] Inventors: William M. Baumann, Downers Grove; David W. House, Arlington Heights; Ray V. Scott, Jr., Addison, all of Ill.

[73] Assignee: UOP, Des Plaines, Ill.

[*] Notice: The portion of the term of this patent subsequent to Apr. 5, 2005 has been disclaimed.

[21] Appl. No.: 149,292

[22] Filed: Jan. 28, 1988

Related U.S. Application Data

[63] Continuation-in-part of Ser. No. 946,731, Dec. 29, 1986, Pat. No. 4,736,009.

[51] Int. Cl.$^4$ .................. C08G 18/70; C08G 18/32; C08G 18/60
[52] U.S. Cl. ......................... 528/68; 528/67; 528/85
[58] Field of Search ............... 528/67, 85, 68

[56] References Cited

U.S. PATENT DOCUMENTS

| | | | |
|---|---|---|---|
| 3,681,291 | 8/1972 | Khan | 528/55 |
| 4,048,105 | 9/1977 | Salisbury | 521/128 |
| 4,324,867 | 4/1982 | Patton, Jr. et al. | 521/159 |
| 4,433,067 | 2/1984 | Rice et al. | 521/51 |
| 4,459,399 | 7/1984 | Ihrman et al. | 528/64 |
| 4,495,081 | 1/1985 | Vanderhider et al. | 528/68 |

Primary Examiner—John Kight
Assistant Examiner—Dennis R. Daley
Attorney, Agent, or Firm—Thomas K. McBride; Eugene I. Snyder

[57] ABSTRACT

Alkylated polyamines which may be viewed as low molecular weight polymers of x-amino-y-methylenephenyl are effective curing agents in combination with other polyamines and polyols in reaction injection molding for a diverse class of polyisocyantates. Alkylation may range from 5 up to 100 percent to afford polyamines with a broad spectrum of cure times, as well as to give elastomers with an interesting and useful diversity of properties. Such polyamines may be used as a constituent in a blend of polyamines as the isocyanate-reactive component, in which case the elastomer may be viewed as predominantly a polyurea, or as a constituent in a blend with polyols, in which case the elastomer may be viewed as an elastomer with both urethane and urea segments.

29 Claims, No Drawings

ALKYLATED TRIAMINES AND HIGHER POLYAMINES AS CURING AGENTS IN POLYURETHANE MANUFACTURE BY REACTION INJECTION MOLDING

CROSS-REFERENCE TO RELATED APPLICATION

This application is a continuation-in-part of our co-pending application Ser. No. 946,731, filed Dec. 29, 1986, now U.S. Pat. No. 4,736,009, all of which is incorporated by reference.

BACKGROUND OF THE INVENTION

As a subclass of commercially available polymers, polyurethane elastomers have several properties whose advantages confer unique benefits on these products. Typically, polyurethanes show high abrasion resistance with high low bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of less expensive fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears and drive wheels.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric alcohols. A large class of such prepolymers are approximately 2:1 adducts of a diisocyanate, OCN—Y—NCO, and a diol, HO—Z—OH, whose resulting structure is OCN—Y—NHCO$_2$—Z—O$_2$CNH—Y—NCO. Although Y is susceptible of great variety, usually being a divalent alkyl, cyclohexyl, or aromatic radical, in fact the most available prepolymers are made from toluene diisocyanate (TDI), most readily available as a mixture of 2,4-and 2,6-isomers which is rich in the former isomer, or methylene-4,4'-diphenyl-diisocyanate (MDI). The diols used display a greater range of variety; Z may be a divalent alkyl radical (i.e., an alkylene group), and the diols frequently are ethers or esters which are the condensation products of glycols with alkylene oxides or dicarboxylic acids, resp.

The polyurethane elastomers are formed by curing the prepolymer. Curing is the reaction of the terminal isocyanate groups of the prepolymer with active hydrogens of a polyfunctional compound so as to form high polymers through chain extension and, in some cases, crosslinking. Diols, especially alkylene diols, are the most common curing agents for MDI-based prepolymers, and representing such diols with the structure HO—X—OH, where X is an organic moiety, most usually an alkylene group, the resulting polymer has as its repeating unit,

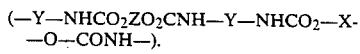

Where a triol or a higher polyhydric alcohol is used crosslinking occurs to afford a nonlinear polymer.

Although other polyfunctional chemicals, especially diamines, are theoretically suitable, with but a few exceptions none have achieved commerical importance as a curing agent. The major exception is 4,4'-methylene-di-ortho-chloroaniline, usually referred to as MOCA, a curing agent which is both a chain extender and a crosslinker. TDI-based prepolymers typically are cured with MOCA, and the resulting products account for perhaps most of the polyurethane elastomer market. One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material to be cast into molds. This property is conventionally referred to as pot lift. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with some prepolymers as to afford a desirable pot life, hence the use of, for example, MOCA as a curing agent for TDI-based prepolymers. However, MOCA and others of the aforementioned diamines still remain too reactive to be used, for example, with MDI-based prepolymers.

On the other hand, the advent of reaction injection molding (RIM) provides a means of processing polyurethanes which is well adapted to a short pot life. Reaction injection molding is a process that allows polymerization and crosslinking to take place simultaneous with forming of a part into its final shape. Because of the rapid curing of polyurethanes, compatible with the fast cycle times of RIM, these polymers seem exceptionally well suited to RIM processing although epoxies, nylons, and even polyesters have been made by the RIM process.

In RIM, too highly reactive streams of chemicals are brought together under high pressure in a small mixing chamber where the streams are impingement mixed by being sprayed directly into each other before entering the mold. The mixed material flows directly into a mold at 0.35–0.7 MPa (50–100 psi), a low pressure compared to that used in standard injection molding, where the chemical reaction is completed and the part cures. One of the ingredient streams (the first stream) contains the isocyanate and the other stream (the second stream) contains components having isocyanate-reactive hydrogens, such as polyols and amines, and other components as catalysts, pigments, blowing agents, and surfactants. Much of the technology is currently used in the automotive industry to produce parts such as bumper covers and fenders. Parts are produced on a cycle of 3 minutes or less, and large urethane parts have been successfully demolded in 30 seconds or less after injection.

We have found that a large class of fully or partially alkylated aromatic polyamines, which can be viewed as polymers whose repeating unit is x-amino-y-methylenephenyl, are excellent isocyanate-reactive components, or curing agents, for polyisocyanates in the preparation of RIM elastomers. Among the advantages of the curing agents of this invention are that the resulting elastomers can be expected to show excellent compression set, to have quite high tensile strength, and to show a substantially higher glass transition temperature than usual with good solvent resistance. The resulting elastomers are thermosetting polymers, and also have the advantage that their properties remain relatively unchanged within a wide range of stoichiometry of curing agent and polyisocyanate. Therefore, the curing agents of this invention are very tolerant to mixing error, which is a decided manufacturing advantage. Additionally, the curing agents themselves for the most part are viscous liquids at room temperature, facilitating their use at RIM temperature. The curing agents may be used for both TDI and MDI-based polyisocyanates, which give rise to the two largest classes of polyurethane and polyurea elastomers, and have excellent thermostability. In short, the unique properties of both the curing agents and the resulting elastomers make each very highly desirable in RIM formulations.

To aid in exposition the isocyanate-reactive components can be classified as either polyols (polyhydric alcohols) or polyamines. Each of these classes has two functionally defined subclassses; backbone polyols (or polyamines) and chain extended polyols (or polyamines). The difference is that, e.g., the backbone polyol reacts with the isocyanates in the first stream to afford short polymeric segments, and the chain extended polyamine links the short segments to form longer chains. The polyamines of this invention act as chain extender polyamines.

The RIM elastomers which can be made from the amines of this invention are diverse and depend upon the nature of the isocyanate-reactive stream. In one variant the second stream as the isocyanate-reactive component is a mixture of backbone and chain extender polyamines. That is, the second stream may have catalysts, pigments, surfactants, etc., but contain little, if any, isocyanate-reactive components other than the polyamines. In this variant the elastomer is exclusively, or almost so, a polyurea.

In another variant the second stream has as the isocyanatereactive component a mixture of the amines of this invention, which act as chain extender amines, and various backbone polyols. The mixture will generally have from about 20 to about 80% of amine, on an equivalents basis, and more usually contains 30-70 equivalents percent of amine. (An equivalent of polyamine or polyol is an amount which furnishes as many amino or hydroxyl groups as there are isocyanate groups in the first stream. As used herein, "equivalents percent" refers to the percentage of amine and/or polyol equivalents relative to isocyanate equivalents.)

In each of the foregoing variants a portion of the chainextender polyamines of this invention may be replaced by a chain extender polyol or a second chain extender polyamine. Although this will be described more fully within, to exemplify one of these subvariants the second stream may contain a backbone polyamine, the chain extender polyamines of this invention, and a chain extender polyol where the polyol level is roughly 20-50 equivalents percent of the chain extender polyamine.

SUMMARY OF THE INVENTION

The object of this invention is to prepare polyurethane and polyruea elastomers by reaction injection molding using fully or partially alkylated aromatic polyamines as curing agents. In an embodiment the curing agent is an alkylated polymer whose repeating unit is x-amino-y-methylenphenyl, where the alkyl group contains up to about 20 carbon atoms. In a specific embodiment the polyamine has more than two-thirds of its amino groups alkylate. In a still more specific embodiment the curing agent has from 1-10 repeating units. Other objects and embodiments will become obvious from the description which follows.

DESCRIPTION OF THE INVENTION

In one aspect the invention herein is a reaction injection molded elastomer made by reacting a polyisocyanate and a mixture of isocyanate-reactive material having one or more polyamines of this invention as a chain extender polyamine. Where the mixture is a blend of backbone and chain extender polyamines the resulting elastomers may be viewed as polyureas. Where the mixture is a blend of backbone polyol and chain extender polyamines the resulting elastomers may be viewed as mixed polyureas-polyurethanes. However, it will be understood by those skilled in the art that the elastomers made according to the latter are complex chemical structures having both polyurethane and polyurea segments.

The nature and breadth of our invention may be summarized by characterizing the reactive components in the two streams as well as their ratio of equivalents. The key for the following table is:

$I$ = polyisocyanate;
$B_A$, $B_o$ = backbone polyamine and polyol, resp.;
$P$ = polyamide of this invention;
$E_A$, $E_o$ = chain extender polyamine and polyol, resp.

| Component Variation in RIM Elastomer | | | | |
|---|---|---|---|---|
| Component | Case 1 | Case 2 | Case 3 | Case 4 |
| I | x | x | x | x |
| $B_A$ | x | x | | |
| $B_O$ | | | x | x |
| P | x | x | x | x |
| $E_A$ and/or $E_O$ | | x | | x |

The combination of specified components along with their ratios then fully define this invention. Those ratios which are independent variables, their verbal characterization, and their values for variants of our invention follow.

The ratio $r_1$, $$r_1 = \frac{B_A \text{ (or } B_o) + P + E_o + E_A}{I},$$

is the ratio of equivalents of isocyanate-reactive components in the second stream to the polyisocyanate in the first stream. In all cases this ratio is between 0.7 and 1.3, and more generally is between 0.85 and 1.05, and even more frequently is between about 0.90 and about 1.0.

The ratio $r_2$, $$r_2 = \frac{P + E_A + E_o}{B_A \text{ (or } B_o) + P + E_A + E_O},$$

is the ratio of equivalents of the polyamines of this invention plus other chain extenders, if any, to the total isocyanate-reactive components of the second stream. In all cases $r_2$ is between 0.2 and 0.8, with the preferred ratio being from about 0.3 to about 0.7. Stated differently the ratio varies around a central point where the number of equivalents of the backbone polyamine or polyol is equal to that of the other isocyanate-reactive components of the second stream.

In one variant $E_A$, $E_o=0$, i.e., there are no chain extenders in the second stream other than the polyamines of this invention. This corresponds to case 1 and case 3 resp.

In another variant the second stream contains a chain extender polyol in addition to the other isocyanate-reactive components $B_A$ (or $B_o$) and P. This polyol is present to the extent of about 20 to about 50 equivalents percent based on the polyamines of this invention. Since the polyamines of this invention have been designated as chain extender polyamines, the foregoing is equivalent to the statement that chain extender polyols constitute from about one-sixth to about one-third of the total chain extender mixture. That is, $r_3$, where $$r_3 = \frac{E_o}{E_o + P},$$

ranges between about 0.17 and about 0.33.

In the last variant to be discussed here the second stream contains a second chain extender amine in addition to the other isocyanate reactive components $B_A$ (or $B_o$) and P. In this case the polyamines of our invention are only a minor component, with the second chain extender amine constituting 80-99 equivalents percent of the chain extender components. Defining $r_4$ as, $$r_4 = \frac{E_A}{P + E_A},$$

this ratio of equivalents is between about 0.80 and about 0.99.

A broad variety of polysiocyanates may be used in the preparation of RIM elastomers and may be exemplified by such materials as the toluene diisocyanates, p- and m-phenylene diisocyanate, tetramethylene diisocyanate, 1,6-hexamethylene diisocyanate, 1,4-cyclohexylene diisocyanate, 4,4'-methylenedicyclohexyl diisocyanate, 4,4'-methylenediphenyl diisocyanate, 3,3'-dimethyl-4,4'-diphenylmethane diisocyanate, 1,5-tetrahydronaphthalene diisocyanate, dianisidine diisocyanate, bitolylene diisocyanate, naphthalene-1,4-diisocyanate, bis(2-methyl-3-isocyanatophenyl)methane, bis(3-methyl-4-isocyanatophenyl)methane, and 4,4'-diphenylpropane diisocyanate.

Also frequently used in RIM processing are methylene-bridged polyphenyl polyisocyanates such as are disclosed and discussed in U.S. Pat. No. 4,433,067, especially the polyisocyanates based on methylenediphenyl diisocyanate, especially the 4,4'-isomer and the uretonimine modified MDI as described therein. The term polyisocyanate also includes quasi prepolymers of polyisocyanates with active hydrogen containing materials where the polyisocyanates is typically reacted with from about 0.05 to about 0.3 equivalents of a polyol. In principle a vast number of polyisocyanates are suitable for making RIM elastomers. However, in practice polyisocyanates based on MDI are currently those principally used in commerce.

If the polyamines of this reaction are used as the sole isocyanate-reactive components of the second stream the resulting elastomer is too brittle to be usable. Consequently, it is necessary to have as another isocyanate-reactive component one which will provide a soft segment in the resulting elastomer. We here refer to such components as backbone polyamines and backbone polyols.

The backbone polyamines used in RIM are well known to those skilled in the art but will be mentioned here, though not in great detail, and include diamines, triamines, and possible higher polyfunctional amines which are primary amines. One class of such amines is related to aminodiphenylmethane-ethers and esters of the formulae,

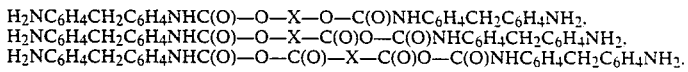

H₂NC₆H₄CH₂C₆H₄NHC(O)—O—X—O—C(O)NHC₆H₄CH₂C₆H₄NH₂.
H₂NC₆H₄CH₂C₆H₄NHC(O)—O—X—C(O)O—C(O)NHC₆H₄CH₂C₆H₄NH₂.
H₂NC₆H₄CH₂C₆H₄NHC(O)—O—C(O)—X—C(O)O—C(O)NHC₆H₄CH₂C₆H₄NH₂.

In these compounds X is usually an alkylene group, an alkyleneoxy group, or a poly(alkyleneoxy) group. A similar set of backbone polyamines used in RIM results from substitution of both H₂NC₆H₄CH₂C₆H₄NHC(O)-groups by H₂NC₆H₃(CH₃)NHC(O)-moieties.

Another class of backbone polyamines have the formula H₂N—Y—NH₂. In one group Y is an alkylene chain. In a larger group Y is a poly(alkyleneoxy) or a polyester moiety with an alkylene group at both terminii. So, for example, in this group are amine-capped polyols which are the reaction product of a polyol and then an amine with alkylene oxides as well as amine-capped hydroxyl-containing polyesters. Materials of molecular weight in the 200-6000 range are most often utilized.

Tri- and higher polyamines of similar structure to that in the foregoing paragraph also may be utilized. For example, the reaction of pentaerythritol with an alkylene oxide will give a polyether product, one terminus of which has the structural unit

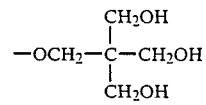

$$-OCH_2-\underset{\underset{CH_2OH}{|}}{\overset{\overset{CH_2OH}{|}}{C}}-CH_2OH$$

This can be amine-capped to give a triamine, and if the hydroxyl group at the other terminus is so capped there will result a tetraamine. Both kinds of products may be used as backbone polyamines.

The backbone polyols used in RIM are equally well known. The polyols used are usually dihydric with trihydric and higher polyhydric polyols used to a lesser degree. Examples of suitable polyols include ethylene glycol, 1,2-propylene glycol, 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, pentaerythritol, mannitol, sorbitol, diethylene glycol, triethylene glycol, tetraethylene glycol, poly(ethylenoxy) glycols generally, dipropylene glycol, poly(propylenoxy) glycols generally, dibutylene glycol, poly(butylenoxy) glycols generally, and the polymeric glycol from caprolactone, commonly known as polycaprolactone.

Other polyhydroxy materials of higher molecular weight are polymerization products of epoxides, such as ethylene oxide, propylene oxide, butylene oxide, styrene oxide, and epichlorohydrin, with materials having reactive hydrogen compounds, such as water and, more particularly, alcohols, including ethylene glycol, 1,3- and 1,2-propylene glycol, trimethylolpropane, etc. Amino alcohols may be made by condensing amino-containing comounds with the foregoing epoxides, using such materials such as ammonia, aniline, and ethylene diamine.

Hydroxyl-containing polyesters, polythioethers, polyacetals, polycarbonates, and polyester amines also may be used instead of or together with the foreging polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Hydroxyl-containing polythioethers, polyacetals, polycarbonates, and polyesteramindes are less frequently employed in the preparation of RIM elastomers. However, these are sufficiently well known to those practicing the art that they need not be further elaborated upon here.

The elastomer is made by reacting the polyisocyanate with a backbone polyamine or polyol and a fully or partially alkylated aromatic polyamine of the structure.

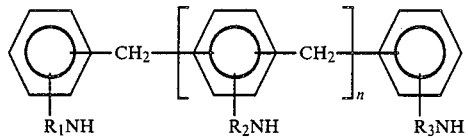

where n is an integer from 1 to about 10, and $R_1$, $R_2$, and $R_3$ are either hydrogen, an alkyl, or an alkenyl group. These polyamines may be viewed as low polymers with the repeating structural unit of x-amino-ymethylenephenyl, where y is 3 or 4, and where x=2, 4, 5, or 6 when y=3, and x=2 or 3 when y=4.

Where one or more of R are alkyl or alkenyl moieites—i.e., a monovalent radical whose parent is a linear or branched alkane or alkene—each is independently selected from the group consisting of alkyl or alkenyl moieties containing from 1 to up to about 20 carbon atoms, and more preferably between 1 and 10 carbon atoms. The alkyl or alkenyl group may be a primary, secondary, or tertiary group, although when it is tertiary there is the risk that cure time may be too long to be commercially acceptable. Secondary alkyl or alkenyl groups are preferred, and among these the secondady butyl group is particularly preferred. Examples of alkyl groups which may be used in the practice of this invention include methyl, ethyl, propyl, butyl, pentyl, hexyl, hepty, octyl, nonyl, decyl, undecyl, dodecyl, tridecyl, tetradecyl, pentadecyl, hexadecyl, heptadecyl, octadecyl, nonadecyl, and eicosyl moieties. Examples of alkenyl groups are the unsaturated counterparts of the aforementioned alkyl groups. As stated previously, secondary alkyl or alkenyl groups, i.e., those branched at the carbon atom bound to the nitrogen atom, and secondary alkyl groups in particular, are preferred in the practice of this invention. Representative of such groups are 2-propyl, 2-butyl, 2-pentyl, 3-pentyl, 2-hexyl, 3-hexyl, and so forth.

By "partially alkylated" polyamine is meant that the number-average of alkyl groups of the polyamine curing agent is less than (n+2). In the context of the prior description, "partially alkylated" means that on the average something under 100% of the R groups are different from hydrogen. Stated differently, as an example the term "67% alkylated" means that on the average 67%, or two-thirds, of the amino groups in the polyamine are alkylated, i.e., have an alkyl or alkenyl group attached thereto. The degree of alkylation has a profound effect on curing time, and since the latter is an important, sometimes determinative characteristic for RIM elastomers it is the index most often used to establish the extent of alkylation. Cure time will depend not only on the average number of alkyl groups per molecule of polyamine, but also will depend on the nature of such groups, their distribution among the various amino groups in the molecule, the presence of other components if a blend of chain extending agents is used, and the nature of other chain extenders in such a blend. For example, in general it will be found that cure times as a function of R increase in the order,

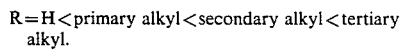

Therefore, all other things being equal a polyamine with only primary alkyls may be more highly alkylated than one with only secondary or tertiary alkyl groups and still exhibit comparable cure times.

The position of the alkyl group also affects curing time in that the amino group on the terminal benzene ring is more reactive than amino groups of internal rings. Thus, if one or both of the terminal amino groups are preferentially alkylated the resulting amine will have a longer cure time than if the internal amino groups are comparably alkylated. Finally, if a partially alkylated polyamine of this invention is used in a blend with, e.g., chain extended polyols the cure time may be expected to be less sensitive to the degree of alkylation, nature of the alkyls, and their distribution among the various amino groups in the molecule.

In view of the foregoing it should be clear that the alkylated polyamines of this invention can be expected to manifest an enormous range of cure time in RIM. This variability presents distinct advantages in permitting the end user to tailor the polyamine to his particular needs. Since the properties of the resulting elastomer also will vary with the polyamines of this invention, and since many partially alkylated polyamines may be chosen with the same cure time, the end user generally also will have a broad choice of our polyamines depending on the performance characteristics sought for the final product.

The polyamines may be as little as about 5% alkylated and may be as great as 100% alkylated. Where the polyamides are greater than about 67% alkylated cure times sometimes may be too long to be acceptable in RIM. However, since catalysts which increase reaction rate up to 4-5 orders of magnitude are known even such highly alkylated polyamines may be used as a component in RIM manufacture with suitable catalysts in their formulation. The polyamines generally will be at least 5% alkylated, more often at least 10% alkylated, and the range of alkylation between about 33% and about 67% may be the one most often practiced. However, polyamines which are from about 68% alkylated to 100% alkylated (i.e., fully alkylated) also are an important variant, especially when used as a curing agent along with a curing catalyst, or as a co-curing agent with another polyamine, and in fact are the subject of this invention.

The alkylated polyamines of this invention typically are prepared by conventional alkylation procedures performed on the precursor primary amine. Largely because of steric factors the terminal amino groups often are preferentially alkylated. Most usually the extent of alkylation will be determined by the relative molar proportions of alkylating agent and polyamine.

As previously stated n is an integer from 1 to about 10, but for ease of preparation and availability polyamines where n is 1 or 2 are materials of choice. Whatever the value of n, the terminal amino groups may be at either the 2,3, or 4 position in the polyamine. However, it is desirable that at least 1 of the terminal amino groups be at the 4 position, and even more desirable that both occupy the 4-position. A major advantage arises from the ease of synthesis of such materials, although it is not to be implied that there are no differences in such materials as curing agents. Analogously, polyamines where y is 3 are preferred because of their relative availability.

In the preparation of the alkylated polyamines of this invention the reaction mixture almost invariably contains significant amounts of the di(aminophenyl)methane which is largely dialkylated, i.e., amines of the general formula above where $n=0$ and $R_1$, $R_3$ each is an alkyl or alkenyl group. The average functionality, $<f>$, of an alkylated polyamine mixture is the average number of amino groups per molecule and may be defined as, $$<f> = \Sigma m_i a_i,$$

where $m_i$ = moles fraction of component i, and $a_i$ = number of amino groups in component i where $a_i = n+2$. Mixtures of alkylated polyamines with a functionality as low as 2.3 may be used in the practice of this invention, although normally the average functionality will be above 2.5.

It follows from the definintion above that, $$<n> = <f> -2.$$

What this says is that the average value of n in any polyamine mixture is the average functionality minus two. For example, a polyamine mixture of average functionality 2.7 results from a mixture of 0.3 mole fraction diamine and 0.7 mole fraction triamine. However, it also results from a mixtures of 0.4 mole fraction diamine, 0.5 mole fraction triamine, and 0.1 mole fraction tetramine and many, many other combinations. What must be emphasized here is that there reference is made to the "polyamines of this invention" or to a "chain extender polyamine" or to "P" such reference incorporates mixtures containing the aforedescribed diamines where the average functionality of the mixture may be as low as 2.3, but more often is greater than 2.5.

Defining an equivalent of polyamine or polyol as an amount which furnishes as many amino groups of hydroxyl groups, resp., as there are isocyanate groups in the first polyisocyante stream, from about 0.70 to about 1.3 equivalents total of the backbone polyamine or backbone polyol and our polyamine are used in curing, with the range from about 0.85 to about 1.05 more frequently used, and from about 0.90 to about 1.0 being the more usual one. Since each molecule of our polyamine has at least 3 amino groups, none of which are tertiary, the polyamines of this invention may act both as chain extenders and as crosslinkers. It is this duality of properties residing in the same molecule which lends uniqueness to our polyamines, as discussed below. As elaborated upon below the curing mix may contain other materials, including other isocyanate-reactive components such as chain extender polyols and polyamines, in addition to, or partly replacing, the polyamines of this invention, although the presence of such materials may not be necessary to the success of this invention.

Amplifying our prior remarks somewhat, since each molecule of our polyamine has at least three amino groups, none of which are tertiary, the polyamines of this invention may act both as chain extenders and as crosslinkers. This duality of properties residing in the same molecule lends uniqueness to our polyamines as curing agents, especially in the case of highly alkylated ($>67\%$) amines where both the chain extending and crosslinking functionality is a secondary amino group. Although a diamine having at least one primary amino group also may act as both a chain extender and a crosslinking agent by reaction of the primary amino functionality with two isocyanato groups, the reaction leads to formation of a biuret, hence the functional groups arising from crosslinking with primary amino groups are fundamentally different than those arising from crosslinking where, as here, only secondary amino groups are involved. It will be recognized that in our polyamines such a duality of properties requires at least three amino groups in the same molecule, i.e., the duality is absent in diamines and first observed in triamines. It also will be recognized that just as elastomers from primary amines as curing agents may have significantly different properties than elastomers from secondary amines as curing agents, elastomers from amines as curing agents having both chain extending and crosslinking features in the same molecule can be expected to be significantly different that other superficially analogous elastomers. What also can be expected is that elastomers made using curing agents of this invention will exhibit a vast diversity of properties, albeit unpredictably so.

As stated above, catalysts may need to be used to decrease the reaction time in order to obtain a mixture which sets sufficiently rapidly in the mold to conform to the process requirements of RIM, especially in that variant of interest here where the polyamine is 68% to 100% alkylated. Organic tin compounds are probably most frequently used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or as a complex with amidines such as amino pyridines, amino pyrimidines, hydrazino pyridines, and tetrahydropyrimidines.

Catalysts based on metals such as lead, iron, mercury, cobalt and manganese also have been used, and include compounds such as cobalt (III) acetylacetonate, cobalt naphthoate, manganese naphthoate, lead oleate, zinc naphthenate and zirconium naphthenate. Other catalysts which may be used include tertiary amines such as triethylamine, tributylamine, N-methylmorpholine, 1,4-diaza-bicyclo-(2,2,2)-octane, N-methyl-N'-dimethylaminoethylpiperazine, N,N-dimentylbenzylamine, N,N-dimethylcyclohexylamine, and 1,2-dimethylimidazole.

Other catalysts such as silaamines and basic nitrogen compounds such as tetraalkyl ammonium hydroxide, alkali metal hydroxides such as sodium hydroxide, and alkali metal alcoholates such as sodium methylate also have been used as catalysts. These catalysts are generally used in an amount from about 0.01 to about 10% by weight, preferably from about 0.05 to about 1.0% by weight, based on the quantity of polyisocyanate and the quantity of materials reacting with the polyisocyanate.

The second stream also may contain materials such as blowing agents and surfactants. Among suitable blowing agents are water and readily volatile organic substances or dissolved inert gases such as acetone, ethylacetate, methanol, ethanol, halogen substituted alkanes including methylene chloride, chloroform, vinylidene chloride, monofluorotrichloromethane, chlorodifluoromethane, and dichlorofluoro-methane, butane, hexane, heptane, diethyl ether, nitrogen, air, carbon dioxide, etc. Examples of surfactants include the sodium salts of sulfonates or of fatty acids, amine salts of fatty acids, alkali metal or ammonium salts of sulfonic acids, polyether siloxanes, and the like. The second component also may contain pigments, dyes, flame retardants, stabilizers, plasticizers, fungicides and bactericides, and fillers.

As previously noted the blend of backbone polyamine or polyol and the chain extruder amines of our invention may also contain one or more chain extender polyols or a second chain extruder polyamine. The chain extender polyols used in this branch of our invention are polyhydric alcohols with more than two reactive hydroxyl groups per molecule, i.e., more than two hydroxyl groups per molecule must react with the terminal isocyanate groups of the polyisocyanate. Normally this means the polyols are at least trihydric, but since some trihydric alcohols may have one or more hydroxyl groups unreactive under the reaction conditions of curing, it is not invariably true that a trihydric alcohol will suffice. In particular, phenolic hydroxyl moieities, and hydroxyl groups attached to a tertiary carbon atoms, usually will be unreactive in curing polyisocyanates, whereas the hydroxyl moiety associated with primary and secondary alcohols will be reactive. With the use of polyols having more than two reactive hydroxyls per molecular it is clear that such materials act as both cross-linkers and chain extenders, although for convenience we refer to such materials as chain extender polyols. Among the polyols which may be used are included 1,1,1-tri(hydroxymethyl)propane, otherwise known as 2,2-di(hydroxymethyl)-1-butanol, 1,1,1-tri(hydroxymethyl)ethane, N,N,N',N'-tetrakis(2-hydroxypropyl)ethylene diamine, 2,4,6-tris(N-methyl-N-hydroxymethylaminomethyl)phenol, 1,2,6-hexanetriol, 1,2,4-butanetriol, pentaerythritol, mannitol, sorbitol, triglycols, castor coils, triisopropanolamine, and N,N,N'N'-tetrakis(hydroxyethyl)ethylene diamine. Chain extender polyols commonly are used at a level between about 20 and about 50 equivalents percent based on the polyamines of our invention subject to the constraints on the ratio $r_1$ and $r_2$; vide spura.

Where the blend of backbone polyamine or polyol and the polyamimes of our invention contains a second chain extender polyamine, the latter generally is a diamine where both amino groups are primary amino groups, and even more frequently is an aromatic primary diamine. Such materials include 1-methyl-3,5-diethyl-2,4-diaminobenzene, 1-methyl-3,5-diethyl-2,6-diaminobenzene, toluene diamine, 1,3,5-triethyl-2,6-diaminobenzene, 3,3'-dichloro-4,4'-diaminodiphenylmethane (MOCA) and the like. When used in a blend with the polyamines of this invention the second chain extender polyamine constitutes the major portion of the blend, viz., from about 80 to about 99 equivalents percent of the mixture of the polyamines of this invention and the second chain extender polyamine is the latter.

The process of reaction injection moldings has been described above and will not be repeated here. Solidificiation of the reaction mixture after injection into the mold usually takes place so rapidly that the mold may be opened within about 15–30 seconds to afford material with sufficient green strength to be handled. Post curing of the elastomer is optional and will depend on the desired properties of the end product, the various components used, etc. Where post curing is desired it generally will be performed in a range between about 100° C. and about 150° C. for a time between about 1 and about 24 hours.

EXAMPLES

Typical Rim Formulation

A typical RIM machine for polyurethane and polyurea RIM may be employed without modification, In the A-side (or the isocyanate) reservoir of the RIM machine is added the isocyanate to be used: In this case, a low molecular weight MDI-ether prepolymer. In the B-side reservoir are added the polyol, the polyamines of this invention, and any other co-cures or additives compatible with the polyol and polyamine. In polyurea RIM, the polyol would be replaced with a polyamine in order to form the backbone of the polyurea with the isocyanate. Both the A- and B-sides are cycled through their respective heat exchangers where both are brought up to 70° C. Both sides are flowed to their respective metering pumps which are loaded for the shot. The ratio of the two (which determines the stoichiometry of the final polymer) and the shot size have been predetermined. The pistons of the metering pumps are engaged and the shot forced into the mixing head and through to the mold which is attached to the mixing head and is heated to between 70 and 100° C. After about 30 to 60 seconds, the mold is opened, the part ejected, the mold and the mixing head cleaned, and a new shot readied. The part may be post-cured from 30 minutes to 17 hours depending on the type of polymer made and the components used. Several representative formulations and RIM conditions are summarized below.

TABLE 1

| Sample RIM Formulations using Representative Polyamines(1) | | | |
|---|---|---|---|
| Isocyanate | MDI Prepolym 0.730 kg 4.00 equiv. | MDI Prepolym 1.391 kg 7.62 equiv. | MDI Prepolym 0.730 kg 4.00 equiv. |
| Polyol Backbone | Polyether, Mol. Wt. 2000 F = 2 2.000 kg 2.00 equiv. | Polyether, Mol. Wt. 1050 F = 2 2.000 kg 3.81 equiv. | Polyether, Mol. Wt. 2000 F = 2 2.000 kg 2.00 equiv. |
| Polyamine | (2) 0.245 kg 1.90 equiv. | (3) 0.498 kg 3.62 equiv. | (3) 0.261 kg 1.90 equiv. |
| Catalyst | DBTDL, 0.15% | DBTDL, 0.10% | DBTDL, 0.15% |
| Stream Temp. | 50° C. | 50° C. | 50° C. |
| Mold Temp | 70° C. | 70° C. | 70° C. |
| Post-cure Temp. | 100° C. | 100° C. | 100° C. |
| Post-cure | 1.0 | 1.0 | 1.0 |

TABLE 1-continued

Sample RIM Formulations using Representative Polyamines(1)

Time, h (1) Ratios of the reagents metered out reflect the masses listed in the table. The isocyanate index is 1.05 in all cases.
(2) On the polyamine, all R groups are 2-butyl; functionality is 3.0 and the degree of alkylation is 75%. The equivalent weight is 129.
(3) On the polyamine, all R groups are 2-butyl; functionality is 3.0 and the degree of alkylation is 90%. The equivalent weight is 137.5.

TABLE 2

Sample RIM Formulations Using Representative Polyamines(1).

| Isocyanate | MDI Prepolym 0.833 kg 4.56 equiv. | MDI Prepolym 0.730 kg 4.00 equiv. | MDI Prepolym 1.391 kg 7.62 equiv. |
|---|---|---|---|
| Polyol Backbone | Polyether, Mol. Wt. 2630 F = 3 2.000 kg 2.28 equiv. | Polyether, Mol. Wt. 2000 F = 2 2.000 kg 2.00 equiv. | Polyether, Mol. Wt. 1050 F = 2 2.000 kg 3.81 equiv. |
| Polyamine | (2) 0.280 kg. 2.17 equiv. | (3) 0.250 kg. 1.90 equiv. | (4) 0.619 kg 3.62 equiv. |
| Catalyst | NONE | NONE | NONE |
| Stream Temp. | 50° C. | 50° C. | 50° C. |
| Mold Temp | 70° C. | 70° C. | 70° C. |
| Post-cure Temp. | 100° C. | 100° C. | 100° C. |
| Post-cure Time, h | 2.0 | 2.0 | 2.0 |

(1)Ratios of the reagents metered out reflect the masses listed in the table. The isocyanate index is 1.05 in all cases.
(2)On the polyamine, all R groups are 2-propyl; functionality is 3.0 and the degree of alkylation is 100%. The equivalent weight is 129.
(3)On the polyamine, all R groups are 2-butyl; functionality is 3.0 and the degree of alkylation is 80%. The equivalent weight is 131.8.
(4)On the polyamine, all R groups are 2-octyl; functionality is 3.0 and the degree of alkylation is 75%. The equivalent weight is 171.1.

TABLE 3

Sample RIM Formulations Using Representative Polyamines(1)1.

| Isocyanate | MDI, Carbodi-imide modified 0.569 kg 4.00 equiv. | MDI, Carbodi-imide modified 0.569 kg 4.00 equiv. | MDI, Carbodi-imide modified 0.569 kg 4.00 equiv. |
|---|---|---|---|
| Polyol Backbone | Polyether, Mol. Wt. 2000 F = 2 2.000 kg 2.00 equiv. | Polyether, Mol. Wt. 2000 F = 2 2.000 kg 2.00 equiv. | Polyether Mol. Wt. 2000 F = 2 2.000 kg 2.00 equiv. |
| Polyamine | (2) 0.191 kg 1.33 equiv. (70%) | (2) 0.014 kg 0.09 equiv. (5%) | (3) 0.058 kg. 0.38 equiv. (20%) |
| Chain extender | A (4) 0.042 kg. | B (5) 0.161 kg. | B (5) 0.135 kg |
| Polyol or Polyamine | 0.58 equiv. (30%) | 1.81 equiv. (95%) | 1.52 equiv. (80%) |
| Catalyst | DBTDL, 0.15% | NONE | NONE |
| Stream Temp. | 60° C. | 50° C. | 50° C. |
| Mold Temp | 70° C. | 70° C. | 70° C. |
| Post-cure Temp. | 100° C. | 100° C. | 100° C. |
| Post-cure Time, h | 3.0 | 1.0 | 1.0 |

(1) Ratios of the reagents metered out reflect the masses listed in the table. The isocyanate index is 1.05 in all cases.
(2) On the polyamine, all R groups are 2-butyl; functionality is 3.0 and the degree of alkylation is 100%. The equivalent weight is 143.3.
(3) On the polyamine, all R groups are 2-butyl; functionality is 2.7 and the degree of alkylation is 70%. Equivalent weight is 152.
(4) Polyol (A): N,N,N′,N′—tetrakis(2-hydroxypropyl)ethylenediamine.
(5) Polyamine (B): diethyltoluene diamine (DETDA).

TABLE 4

Polyurea RIM Formulations using Polyamines and an Amine Chain Extender(1).

| Isocyanate | MDI, carbodi-imide modified 0.341 kg 2.39 equiv. | MDI carbodi-imide modified 0.341 kg 2.39 equiv. | MDI carbodi-imide modified 0.341 kg 2.39 equiv. |
|---|---|---|---|
| Polyamine Backbone | Polyoxyalky-lene amine Mol. Wt. 5000 F = 3 2.000 kg 1.20 equiv. | Polyoxyalky-lene amine Mol. Wt. 5000 F = 3 2.000 kg 1.20 equiv. | Polyoxyalky-lene amine Mol. Wt. 5000 F = 3 2.000 kg 1.20 equiv. |
| Polyamine | (2) 0.013 kg. 0.11 equiv. (10%) | (3) 0.008 kg. 0.06 equiv. (5%) | (4) 0.020 kg 0.11 equiv. (10%) |
| Chain extender Polyamine | A(5) 0.091 kg 1.03 equiv. (90%) | A(5) 0.096 kg 1.08 equiv. (95%) | B(6) 0.110 kg 1.03 equiv. (90%) |
| Catalyst | NONE | NONE | NONE |
| Stream Temp. | 50° C. | 50° C. | 50° C. |
| Mold Temp | 70° C. | 70° C. | 70° C. |
| Post-cure Temp. | 100° C. | 100° C. | 100° C. |
| Post-cure Time, h | 1.0 | 0.5 | 1.0 |

(1)Ratios of the reagents metered out reflect the masses listed in the table. The isocyanate index is 1.05 in all cases.
(2)On the polyamine, all R groups are 2-propyl; functionality is 3.0 and the degree of alkylation is 68%. The equivalent weight is 116.
(3)On the polyamine, all R groups are 2-butyl; functionality is 3.0 and the degree of alkylation is 100%. The equivalent weight is 143.3.
(4)On the polyamine, all R groups are 2-octyl; functionality is 3.0 and the degree of alkylation is 80%. The equivalent weight is 176.7.
(5)A = diethyltoluene diamine (DETDA).
(6)B = Ethacure 300, (Ethyl Corp.), an 80/20 isomeric mixture of di(methylthio)-2,4-toluene diamine and di(methylthio)-2,6-toluene diamine

What is claimed is:

1. A reaction injection molded elastomer made by reacting in a closed mold a first stream comprising one or more polyisocyanates with a second stream comprising from about 0.7 to about 1.3 equivalents of a blend of compounds having isocynate reactive hydrogens said blend consisting essentially of a backbone polyamine ($B_A$) or a backbone polyol ($B_o$) and a chain extender polyamide (P) which is at least one alkyalted aromatic polyamine of the structure.

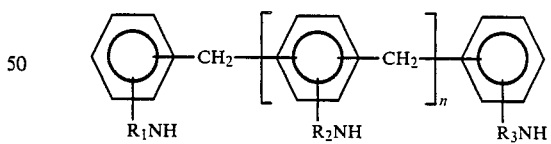

where $R_1$, $R_2$, and $R_3$ are independently selected from the group consisting of hydrogen or an alkyl or alkenyl moiety containing from 1 to about 20 carbon atoms, where n is an integer from 1 to about 10, and where the number average of said R groups different from hydrogen is between at least 68 and about 100 percent of (n+2), and where the chain extender polyamine constitutes from about 20 to about 80 equivalents percent of the blend.

2. The elastomer of claim 1 where the second stream contains from 0.85 to 1.05 equivalents of isocyanate-reactive components.

3. The elastomer of claim 2 where the stream contains from about 0.90 to about 1.0 equivalents.

4. The elastomer of claim 1 where the chain extender polyamine constitutes from about 30 to about 70 equivalents percent of the blend.

5. The elastomer of claim 1 where the polyisocyanate is toluene diisocyanate, methylenediphenyl diisocyanate, or a polymer of methylenediphenyl diisocyanate.

6. The elastomer of claim 1 where n is 1 or 2.

7. The elastomer of claim 1 where the alkyl or alkenyl moiety contains from 1 to about 10 carbon atoms.

8. The elastomer of claim 2 where the moiety is an alkyl moiety.

9. The elastomer of claim 8 where the alkyl moiety is a secondary alkyl moeity.

10. The elastomer of claim 9 where the alkyl moiety is isopropyl or sec-butyl.

11. The elastomer of claim 1 where at least 1 of the terminal amino groups of the chain extender polyamine is at the 4-position of the aromatic ring.

12. The elastomer of claim 11 where both of the terminal amino groups are at the 4-position of the aromatic ring.

13. The elastomer of claim 1 where at least 68% of the amino groups of the chain extender polyamine are alkylated, the alkyl moiety is a sec-butyl moiety, n is 1, and both terminal amino groups are at the 4-position of the aromatic ring.

14. The elastomer of claim 1 further characterized in that the chain extender polyamine has an average functionality of greater than 2.3.

15. The elastomer of claim 14 where the average functionality is greater than 2.5.

16. A reaction injection molded elastomer made by reacting in a closed mold a first stream comprising one or more polyisocyanates with a second stream comprising from about 0.7 to about 1.3 equivalents of a blend of compounds having isocyanates reactive hydrogens said blend consisting essentially of a backbone polyamine $(B_A)$ or a backbone polyol $(B_0)$ and a mixture of chain extenders consisting essentially as a first component a chain extruder polyamine (P) which is at least one alkylated aromatic polyamine of the structure,

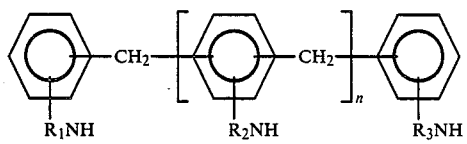

where $R_1$, $R_2$, and $R_3$ are independently selected from the group consisting of hydrogen or an alkyl or alkenyl moiety containing from 1 to about 20 carbon atoms, where n is an integer from one to about 10, and where the number average of said R groups different from hydrogen is between at least 68 and about 100 percent of (n+2), and as a second component a chain extender polyol, where from about 20 to about 50 percent of the mixture of chain extenders is said chain extender polyol, and where the mixture of chain extenders constitutes from about 20 to about 80 equivalents percent of the blend.

17. The elastomer of claim 16 where said polyol is 1,1,1-tri(hydroxymethyl)propane, N,N,N',N'-tetrakis(2-hydroxypropyl)ethylene diamine, or 2,4,6-tris(N-methyl-N-hydroxymethylaminomethyl)phenol.

18. A reaction injection molded elastomer made by reacting in a closed mold a first stream comprising one or more polyisocyanates with a second stream comprising from about 0.7 to about 1.3 equivalents of a blend of compounds having isocyanate reactive hydrogens said blend consisting essentially of a backbone polyamine $(B_A)$ or a backbone polyol $(B_o)$ and a first chain extender polyamine (P) which is at least one alkylated aromatic polyamine of the structure,

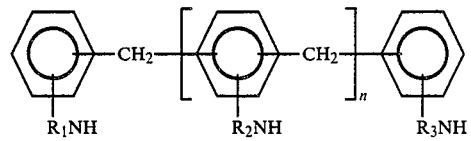

where $R_1$, $R_2$, and $R_3$ are independently selected from the group consisting of hydrogen or an alkyl or alkenyl moiety containing from 1 to about 20 carbon atoms, where n is an integer from 1 to about 10, and where the number average of said R groups different from hydrogen is between at least 68 and about 100 percent of (n+2), along with a second chain extender amine selected from the group consisting of 1-methyl-3,5-diethyl-2,4-diaminobenzene, 1-methyl-3,5-diethyl-2,6-diaminobenzene, toluene diamine, 1,3,5-triethyl-2,6-diaminobenzene, 3,3'-dichloro-4,4'-diaminodiphenylmethane where the second chain extender polyamine constitutes from about 80 to about 99% equivalents percent of the mixture of chain extender polyamines and the mixture of first and second chain extender polyamines constitutes from about 20 to about 80 equivalents percent of the blend.

19. The elastomer of claim 18 where the second stream contains from 0.85 to 1.05 equivalents of isocyanate-reactive components.

20. The elastomer of claim 19 where the stream contains from about 0.90 to about 1.0 equivalents.

21. The elastomer of claim 18 where the polyisocyanate is toluene diisocyanate, methylenediphenyl diisocyanate, or a polymer of methylenediphenyl diisocyanate.

22. The elastomer of claim 18 where n is 1 or 2.

23. The elastomer of claim 18 where the alkyl or alkenyl moiety contains from 1 to about 10 carbon atoms.

24. The elastomer of claim 18 where the moiety is an alkyl moiety.

25. The elastomer of claim 24 where the alkyl moiety is a secondary alkyl moiety.

26. The elastomer of claim 25 where the alkyl moiety is isopropyl or sec-butyl.

27. The elastomer of claim 18 where at least 1 of the terminal amino groups of the first chain extender polyamine is at the 4-position of the aromatic ring.

28. The elastomer of claim 27 where both of the terminal amino groups are at the 4-position of the aromatic ring.

29. The elastomer of claim 18 where at least 68% of the amino groups of the first chain extender polyamide are alkylated, the alkyl moiety is a sec-butyl moiety, n is 1, and both terminal amino groups are at the 4-position of the aromatic ring.

* * * * *

UNITED STATES PATENT AND TRADEMARK OFFICE
CERTIFICATE OF CORRECTION

PATENT NO. : 4,847,347
DATED : July 11, 1989
INVENTOR(S) : Baumann et al.

It is certified that error appears in the above-identified patent and that said Letters Patent is hereby corrected as shown below:

In Claim 1, Column 14, Line 44:  Change "polyamide" to --polyamine--;

Line 44:  Change "alkyalted" to --alkylated--.

Signed and Sealed this

Eighth Day of May, 1990

Attest:

HARRY F. MANBECK, JR.

Attesting Officer        Commissioner of Patents and Trademarks